United States Patent Office

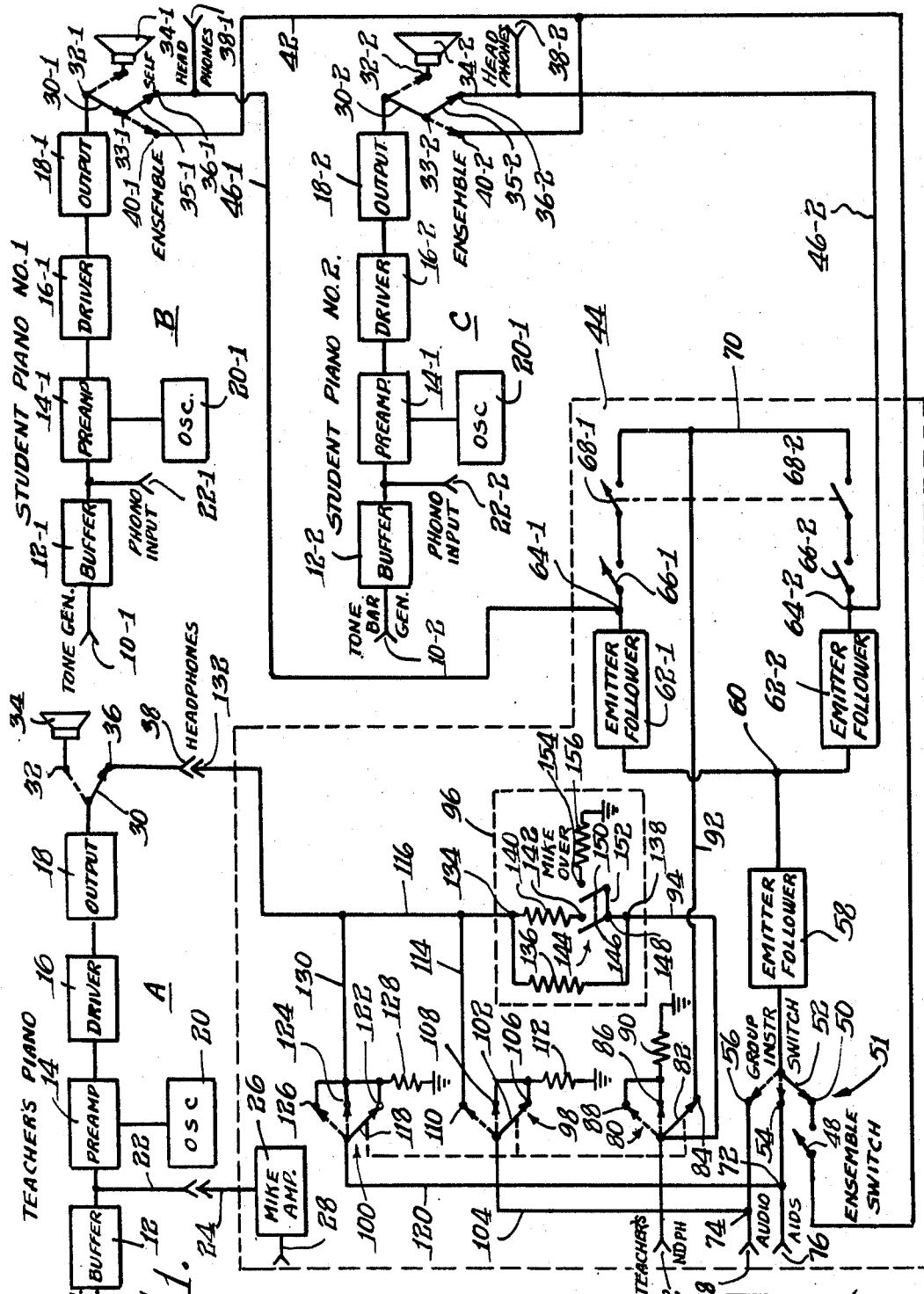

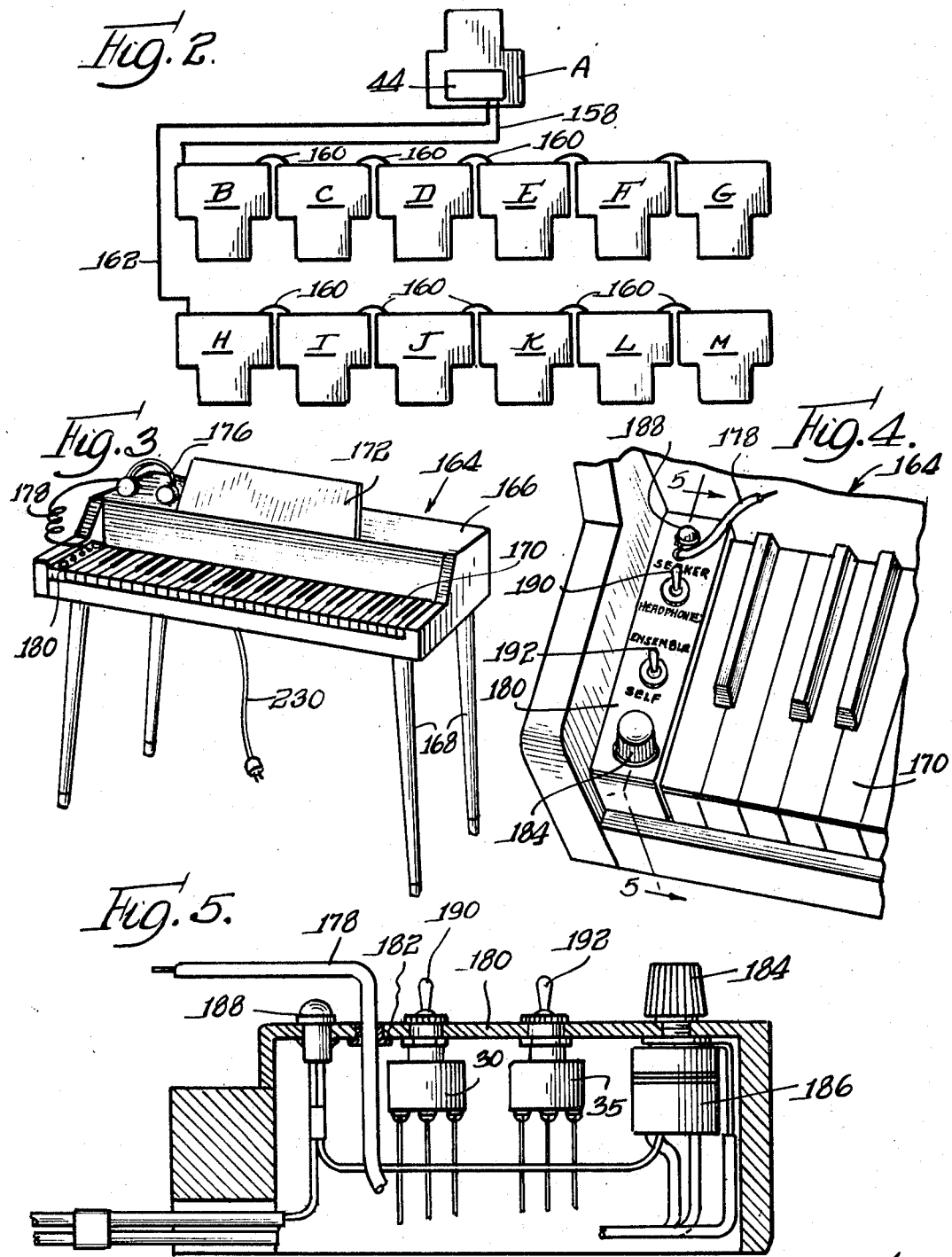

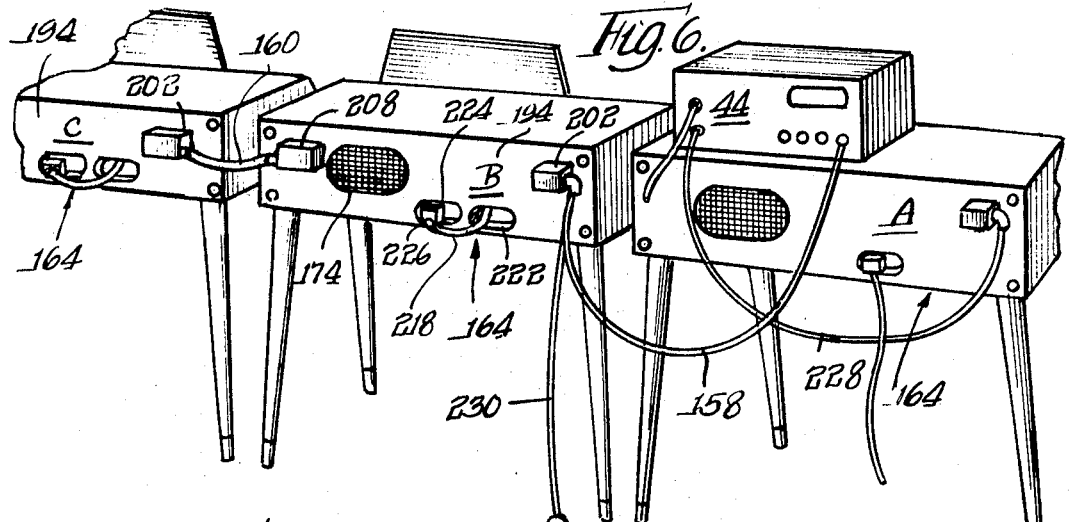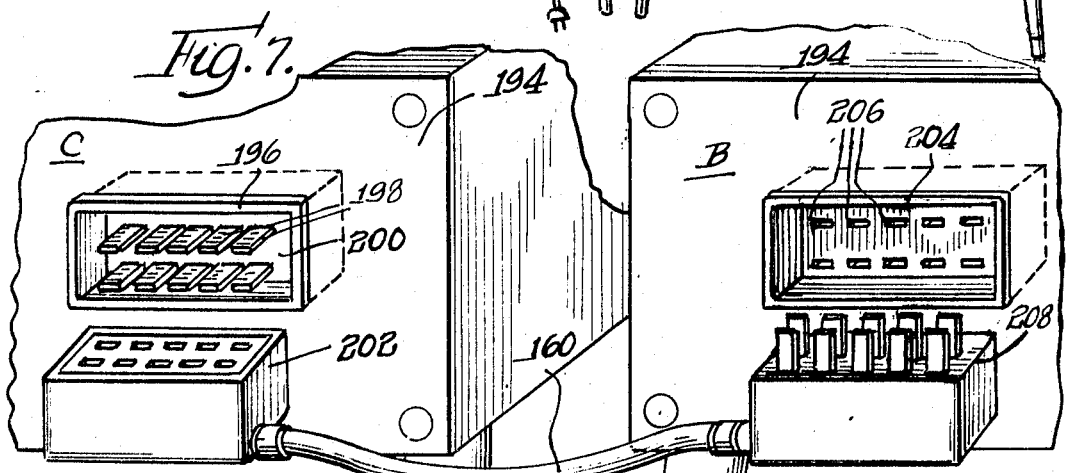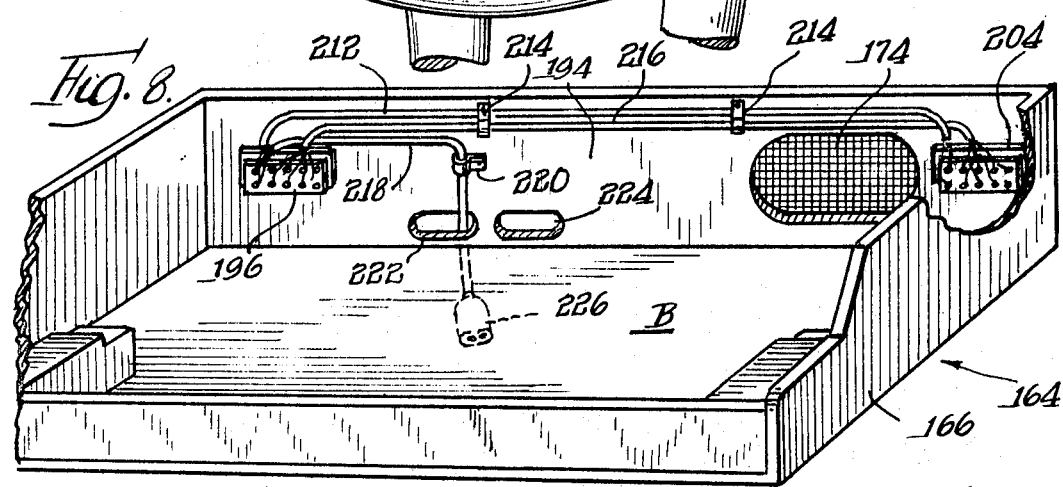

3,475,833
Patented Nov. 4, 1969

3,475,833
ELECTRONIC COMMUNICATION SYSTEM
Clifford W. Andersen, De Kalb, Ill., assignor to The Wurlitzer Company, Chicago, Ill., a corporation of Ohio
Filed Aug. 21, 1967, Ser. No. 661,978
Int. Cl. G09b 15/00, 15/08
U.S. Cl. 35—5                                                8 Claims

ABSTRACT OF THE DISCLOSURE

An electronic communications system for the group teaching of piano students, utilizing a plurality of electric pianos with the provision of external jumper cables for connection to the respective pianos to connect all of the electric pianos to one another and to a single monitor under the control of a teacher, the monitor having switches whereby the teacher can listen to any selected piano to the exclusion of others, or can talk to a student through the earphones by means of which the student listens to his own piano.

---

Traditionally, the teaching of the art of piano playing has been on an individual basis. Space and weight limitations have militated against the placement of a large number of pianos in a single room. Furthermore, since each piano produces a rather loud acoustic sound, a student is almost certain to be distracted from his own studies if two pianos are played in the same room. Thus, the common practice has been for students to have a minimum of individual lessons with long hours of unsupervised practice. Such practice has been in small student practice rooms which are just barely large enough to hold a small piano and the student. Such small rooms have precluded proper resonance, and have rendered it very difficult for a student to determine whether he is playing the proper notes or utilizing proper technique. Obviously, during such unsupervised practice, the student does not have the benefit of a teacher's observation.

I have heretofore solved the space and weight requirements by inventing an electronic piano occupying no more space than a small desk. The piano is readily portable, and may be supported on a desk or on a table, or on detachable legs. Vibratory reeds are used as variable capacitors, and are respectively actuated by piano actions that are very similar to those of conventional pianos. Electric oscillations are thereby generated which are amplified electronically and are transduced into audible tones either by a loudspeaker or by means of earphones. A student may utilize such earphones to listen to his own playing without anyone else in the room being conscious of such playing.

In my prior Patent No. 3,011,431, I have disclosed a musical instrument system for the group teaching of the piano. This system has enjoyed rather considerable commercial success in universities and music schools. In my aforesaid system in my prior Patent 3,011,431, a single cable ran from the teacher's station and was provided with a great many branches for connection to the individual student's pianos. In a typical commercial installation, the cable was over 30 feet long, and at approximately 6-foot intervals there were six branches or takeoffs, each approximately 5 feet long, and having at the end thereof a plastic box for connection to the student piano. Each such box had a switch on it, and an earphone permanently connected to it through a flexible cord. This made a rather formidable mass of cables, wires, earphones, and junction boxes to be carried from one place to another whenever pianos were to be set up in one room or another. Furthermore, even when the pianos were set up, the long cable and many branches were unsightly, and care was required to avoid kicking or tripping over the cable. Furthermore, it will be understood that six pianos would make a rather small group, and as the number of pianos increased, the number of cables, and hence the total length of cable and the number of branches, etc., proliferated. Additionally, each piano was capable of being moved a significant distance from its intended position.

Accordingly, it is an object of the present invention to provide simplified and more compact means for connecting a plurality of electric pianos to a teacher's station or monitor.

More specifically, it is an object of this invention to provide means for connecting electronic pianos to one another, and in more or less series fashion to a monitor or teacher's station, whereby a separate connection from the monitor to each piano is avoided.

More specifically, it is an object of the present invention to provide short jumper cables for interconnecting electric pianos, with a single somewhat longer cable for connecting the first of a series of pianos to a monitor or teacher's station.

Other and further objects and advantages of the present invention will be apparent from the following description when taken in connection with the accompanying drawings wherein:

FIG. 1 is an electric wiring diagram showing the interconnection of a monitor, a teacher's piano and two student pianos in accordance with the principles of the present invention;

FIG. 2 is a somewhat schematic layout or plan view showing one exemplary arrangement of electric pianos in accordance with the present invention;

FIG. 3 is a perspective view of an electronic piano constructed in accordance with the present invention;

FIG. 4 is an enlarged perspective view of the left end of the keyboard of the piano of FIG. 3;

FIG. 5 is a cross sectional view on an enlarged scale taken substantially along the line 5—5 in FIG. 4;

FIG. 6 is a rear perspective view of a series of pianos showing the interconnections thereof;

FIG. 7 is an exploded perspective view of the rear portions of the pianos of FIG. 1 on an enlarged scale; and FIG. 8 is a perspective view of the interior of one of the piano cases according to the present invention.

Attention now should be directed to FIG. 1 wherein the electrical-audio aspects of the invention are illustrated. Thus, turning to the upper left corner of the figure, the teacher's piano is indicated at A. The piano includes a tone generator, which preferably is a vibrating reed and capacity pickup assembly as mentioned heretofore, which is connected at 10 to the input of a buffer amplifier 12. The buffer amplifier is connected to the input of a preamplifier 14, and this in turn is connected to a driver amplifier 16 leading to an output amplifier 18. An oscillator 20 is shown as connected to the preamplifier, and this may be used for producing a vibrato in the piano output. Furthermore, an input connection 22 is provided to the pre-amp for receipt of the output connection 24 from a microphone amplifier 26, having a microphone input at 28.

The output is connected to a movable switch arm 30, and this may engage a fixed contact 32 connected to a loudspeaker 34 for audibly reproducing the amplified electronic oscillations. Alternatively, the movable switch arm 30 may engage a fixed contact 36 leading to a headphone jack 38.

At the right side of FIG. 1 there will be seen a student piano No. 1 identified as B, and below it a student piano No. 2 identified as C. It will be understood that additional student pianos may be connected ad infinitum below B and C, the connections of which will appear presently.

The student pianos are generally identical with the teacher's piano, and similar parts are identified with similar numerals, with the addition of the suffix -1, -2 for the two student pianos illustrated.

As one point of distinction, the student pianos are indicated as being provided with phonograph inputs at 22–1, 22–2, etc. This is similar to the microphone input of the teacher's piano, but it is contemplated that each student might wish to accompany himself with a phonograph, such as playing an orchestral accompaniment, and that the student normally would not use a microphone. A further and perhaps more significant point of distinction is that the switch involving the switch arm 30–1 etc. is selectively connectable to another switch. In addition to the contacts 32–1, 32–2, etc., there is also a fixed contact 33–1, 33–2, etc.

The switch contact 33–1, etc. is connected to a movable switch contact 35–1 which is alternatively engageable with a fixed "Ensemble" contact 40–1, etc. or a fixed "Self" contact 36–1, etc. Each of the ensemble switch contacts 40–1, etc. is connected to a common wire or line 42 leading to a monitor 44, about which more will be said later. Further, in addition to a connection from the fixed switch contacts 36–1 to the headphone jack 38–1, there is a wire 46–1 leading to the monitor 44. There is a similar wire 46–2 from the switch contact 36–2, and so forth with regard to subsequent pianos. These wires are individual, rather than a common wire as is the wire 42.

The common wire 42 is connected to an ensemble switch 48 which leads to a fixed contact 50 of a group instruction switch 51. A movable switch contact 52 is engageable with the fixed contact, or alternatively with one of two other fixed contacts respectively numbered 54 and 56. The movable contact 52 leads to an emitter follower 58 of generally conventional, transistorized design, and this in turn leads to a junction 60. Connected to this junction 60 are emitter followers corresponding to the various student pianos. Thus, there are shown an emitter follower amplifier 62–1 and an emitter follower amplifier 62–2, each of which leads to a respective junction 64–1, 64–2. The wires 46–1 and 46–2 are respectively connected to these junctions, and the junctions are further connected to normally open switches 66–1 and 66–2, these switches in turn being connected to ganged switches 68–1 and 68–2 leading to a common bus 70.

The two switch contacts 54 and 56 are respectively connected to junctions 72 and 74, and to input jacks 76 and 78 for connection of audio aids, which can be phonograph players, electronic metronomes, or any other suitable sources providing electric equivalents of audio sounds.

Immediately above the group instruction switch 51 on the schematic diagram is a three-position switch 80 having a movable contact 82. The movable contact 82 is alternatively engageable with any of three fixed contacts respectively numbered 84, 86 and 88. The contacts 86 and 88 are connected in common through a resistor 90 to ground. The contact 84 is connected through a line 94 to the bus 70.

The movable contact is connected to a headphone jack 92 for the teacher, and also is connected to a wire 94 leading to a "mike-over" unit 96, of which more will be said later.

Ganged with the switch 80 are three-position switches 98 and 100. The switch 98 includes a movable switch contact 102 connected through a wire 104 to the junction 74. The fixed contacts with which the movable contact 102 is alternatively engageable are respectively numbered 106, 108, and 110. The contacts 106 and 108 are connected in common to a resistor 112, the other end of which is grounded. The fixed contact 110 is connected by a wire 114 to a wire 116 leading to the "mike-over" unit 96.

The switch 100 includes a movable contact 118 connected through a wire 120 to the junction 72. The movable contact 118 is selectively engageable with any of three fixed contacts 122, 124, and 126, all of which are connected in common through a resistor 128 to ground, and through a wire 130 to the wire 116. The wire 116 leads to a plug 132 received in the headphone jack of the teacher's piano A.

The "mike-over" unit 96 previously referred to includes a junction 134 to which the wire 116 is connected. The junction 134 is connected through a resistor 136 to a junction 138 to which the wire 94 is connected. Another resistor 140 is connected to the junction 134, and also to a fixed contact 142 of a "mike-over" switch 144 having a movable contact 146 engageable with the fixed contact 142, and connected to a junction 148 which is connected to the junction 138. The "mike-over" switch also includes a movable contact 150 ganged with the movable contact 146, and connected to the movable contact by a wire 152. Like the switch contact 146, the switch contact 150 is normally open, but is selectively engageable with a fixed contact 154 leading through a resistor 156 to ground.

A brief discussion of some of the operation of the parts heretofore described is in order at this point. A student can operate the switch 30–1, etc. to play his piano audibly through the loudspeaker therein. Alternatively, he can move the switch to the contact 33–1, so that he may listen to his own piano through the headphones plugged into the headphone jack 38–1, etc. This may be a direct connection with the switch arm 35–1 on fixed contact 36–1. In addition, he may at the same time, or alternative thereto if he stops playing himself, listen to the teacher's piano, if the group instruction switch is on the contact 56 and the switch 98 is on the contact 110, or if the group instruction switch is on the contact 54. Alternatively, the student may move the switch on his piano from the "self" position 36–1 to the "ensemble" position 40–1, in which case he is connected through the wire 42, and the ensemble switch 58—considering the latter to be closed— and the emitter followers 58 and 62–1 and wire 46–1 back to his own headphones. He will at the same time hear any other student pianos that are switched to the ensemble position through their connection to the common wire 42.

In addition, audio aids plugged in at 76 or 78 may be heard as the group instruction switch is moved to positions 54 or 56. Further, should the teacher wish to give audible instructions to a student whose piano is operating either on the ensemble or headphones position, the teacher closes the "mike-over" switch and speaks into a microphone plugged into the mike amplifier 26 whereby electrical oscillations corresponding to his voice pass through the teacher's piano, through the wire 116, switch contacts 142, 146, wire 94, and switch 80 to the wire 92, and hence to the bus 70 and to the pianos of all of the students for which the teacher has closed the appropriate switch 6–1, etc., it being understood that the switch 68 is closed, and that the switch 80 is in the position in which the movable contact 82 engages the fixed contact 84. The resistances in the "mike-over" unit are properly correlated so that the teacher's voice overrides the sound of any pianos being played. The resistances are also correlated so that the devices connected thereto "see" a substantially constant impedance at all times.

The teacher's and the various students' pianos are capable of arrangement in any of a great number of arrays. One typical array is shown in outline in FIG. 2, wherein the teacher's piano is indicated at A at the front of and facing the group of student pianos. Although the piano itself is rectangular in outline, the somewhat T shape outline is shown to include also the bench, and thus to indicate the orientation of the piano. The student pianos are arranged in two rows facing the teacher's piano, and student piano #1 is indicated at B, student piano #2 is indicated at C, subsequent pianos being indicated through G in the first row. A second row of student pianos is indicated respectively at H through M. The monitor 44 rests on top of the teacher's piano for ready access by the teacher, and connection is made from from the monitor by means of a cable 158 to student piano B. A short jumper cable 160 connects student piano C to student piano B, and each of pianos D through G is connected by a similar jumper cable 160 to the immediately preceding piano. The first piano in the second row, namely student piano H, is connected by a cable 162 to the monitor 44. Subsequent student pianos in the second row are connected, each to the immediately preceding one, by short jumper cables 160, as in the first row. Although the present invention is applicable to pianos in a great number of arrays and different total numbers, it has been found in one practical embodiment of the invention that four rows of six pianos each provides about the maximum number of students that can conveniently be taugh simultaneously by one teacher. It will be appreciated that the jumper cables 160 are quite short, and that the student pianos therefore are more or less locked to one another once they have been set up, whereby students do not—either by design or inadvertence—move their pianos about from the assigned positions. Furthermore, as will appear in greater detail hereinafter, the shortness of the connecting cables or jumpers 160 keeps them off the floor.

An electric piano 164 in accordance with the present invention is shown in FIG. 3. It includes a case 166 supported on legs 168. In a specific example, the case is about 8½ inches high, and the height of the piano standing on the legs is about 33¾ inches. The width from left to right is about 39 inches, and the depth from front to back is about 21½ inches. The piano is provided with a conventional but somewhat shortened keyboard 170 operating more or less conventional piano actions for percussively exciting vibratory reeds, the reeds forming one plate of a variable capacitor for generating the desired tones. The piano further has a music rack 172 upstanding from the center of the case. The loudspeaker 34 is mounted behind a grille 174 on the rear of the piano (see FIG. 6).

Each piano is provided with an A.C. power input connection, as will be discussed at somewhat greater length hereinafter, and student piano #1 has a relatively long A.C. line cord as indicated at 230. Each piano has its own set of headphones or earphones, as previously noted, and headphones 176 are shown in FIG. 3, being connected to the piano by a cord 178. Although reference previously has been made to a plug and jack for connection of the headphones, it has been found that headphones sometimes stray from the vicinity of the piano when a detachable connection is used. Thus, in a preferred form of the invention, the cord 178 passes through the left key block 180 (see also FIGS. 4 and 5), and has a retainer 182 thereon bearing beneath the key block to prevent unauthorized withdrawal of the cord.

The key block also has a knob 184 connected to an "On-Off" switch and volume control 186, and connection is made from this to a pilot light 188 also on the key block. The speaker-headphone switch 30 is mounted beneath the key block, and is operated by a lever 190, and the ensemble-self switch 35 is also mounted on the key block and is controlled by a lever 192.

Attention now should be directed to FIGS. 6–8. In FIG. 6 the teacher's piano A has been oriented immediately adjacent the first student piano B for compactness of illustration. Each student piano is provided on the back wall 194 thereof and near the upper left corner (as viewed from the front—such as FIG. 8) with a multi-contact male connector or plug 196. This connector comprises a plurality of male terminals 198 recessed within a socket 200. The connector is of known design, and in accordance with the specific example of the invention there are ten male terminals or prongs 198. A complementary socket 202 is detachably connected to the plug 196, being shown detached in FIG. 7. Each student piano back wall 194 is further provided near the upper right corner thereof with a recessed receptacle 204, likewise of the multi-contact variety, and having, an illustrative example, ten female terminals 206. A complementary male plug 208 is detachably received in the receptacle 204, being shown separated therefrom in FIG. 7. The plug 208 is connected to the receptacle 202 by means of the flexible jumper cable 160 which includes a length of the wire 42, sections corresponding to parts of the wires 46–1, 46–2, etc., a pair of A.C. power wires, and a braided shield for the audio wires 42, 46, all as will appear shortly.

With specific reference to FIG. 8, a 2-conductor A.C. wire 212 is shown secured to the inside of the back wall 194 of the case 166, being held in place by cable clamps, retainers or cleats 214 of known design. Although capable of variation by way of specific example, the two A.C. conductors of this wire are connected to the two leftmost terminals of the plug 196, and also to the two leftmost terminals of the socket 204. An audio cable 216 is secured parallel to the A.C. wire by the same cable clamps, retainers, or cleats 214. This cable includes a section of the wire 42, and sections of 46–1, 46–2, etc., all mounted within a braided shield, the shield and the other wires being individually connected to the terminals of the plug 196 and of the receptacle 204. Further, a short A.C. jumper wire 218 is connected to the two leftmost terminals of the plug 196, being mounted against the back wall 194 by a cable clamp 220, and extends several inches through a horizontal slot 222 adjacent the bottom of the back wall, and relatively near the plug 196. A second slot 224 is provided shortly to the right of the slot 222, and the wire 218 is long enough to reach this slot, having a well known female receptacle 226 on the end thereof, and of the type commonly used in 110-volt extension cords.

The amplifier for each piano, comprising the buffer 12, preamp 14, driver 16, output amplifier 18, and oscillator 20, is mounted immediately adjacent each slot 224, and is provided with the usual 110-volt male connection. Thus, when the plug 226 is mounted over this male connection as shown in FIG. 6, A.C. power is supplied to the amplifier. Should it be desired to operate any one piano individually without having it connected to other pianos, the receptacle 226 simply is removed from the plug, and the female receptacle of an extension cord is associated with the plug, and the plug of the extension cord is inserted in the normal wall outlet or receptacle.

Each of the student pianos C through G, and I through M is connected to the immediately preceding piano through one of the cables 160, as aforesaid. Student piano B is connected to the monitor 44 through cable 158, as will be seen in FIG. 6 as well as FIG. 2, and the teacher's piano A is connected by a cable 228 to the monitor, the cable 228 including wires 116 and 24. Student piano B (and also H) has an A.C. line cord 230 connected to the receptacle 202, the cable 158 also being connected to this receptacle. As will be understood, the teacher's piano and the monitor are also provided with A.C. line cords.

As will now be apparent, a large number of electric pianos can be set up for a group teaching arrangement in accordance with the present invention. One relatively long cable having one connector at either end thereof is used to connect the first student piano to the monitor used by the teacher, while remaining sudent pianos, up to a total of six in number in the present illustrative example, are simply interconnected with one another by means of short jumper cables, each only one to two feet in length. Each student piano, during its manufacture, is given a number of 1 through 6, and each piano of a given number is wired to a given terminal of the male connector or plug 196. Thus, no matter in what order the student pianos are connected, any given number piano will still be connected to the same wire 46 leading to the monitor. The wires or cables 212, 216 and 218 do not take up any otherwise useful space within the piano case, and the combination of these with the jumper cables 160 provides a very neat assemblage without the necessity of long, branched cables lying on the floor where they readily can be stepped on to the damage of the cables or pianos, and occasionally tripped over. Furthermore, the rather short jumper cables 160 hold each piano in a more or less fixed position with regard to adjacent pianos, whereby an individual student is not likely to move his piano from its assigned place. However, by removal of the jumper cables, and substitution of a readily available extension cord with its socket received in place of the socket 226, any one piano can be removed to another location (or left where it is) for individual use without reliance on any other piano.

The specific example of the invention as herein shown and described is for illustrative purposes only. Various changes will no doubt occur to those skilled in the art, and will be understood as forming a part of the present invention insofar as they fall within the spirit and scope of the appended claims.

The invention is claimed as follows:

1. An electric communications system for the teaching of the playing of a musical instrument comprising a plurality of musical instruments each having a housing and further having means for selectively producing electric oscillations corresponding to the audio tones of that instrument, electro-acoustic transducing means at each instrument for audibly reproducing said oscillations, a plurality of first separable connectors each carried by one of said housings and having a plurality of terminals at least equal in number to said plurality of musical instruments and positioned in predetermined pattern, means connecting the oscillation producing means of each instrument to one of said terminals of that instrument housing, each of said instruments being connected to a terminal of different position in said pattern, a plurality of second separable connectors each carried by one of said housings and also having a plurality of terminals at least equal in number to said plurality of musical instruments and positioned in a predetermined pattern, means associated with each housing interconnecting each terminal of the first connector thereof to a corresponding terminal of the second connector thereof, a plurality of jumper cables having separable connectors respecively complementary to a first separable connector and a second separable connector and readily connected thereto and disconnected therefrom for electrically interconnecting said instruhaving a complementary connector connected to one of the separable connectors of a first of said musical instruments, said cable having a number of terminals and conductors at least equal to those of said one separable connector and respectively connecting said terminals to said monitor, electro-acoustic transducing means connected to said monitor for use as by a teacher, and switch means in said monitor for selectively connecting said electro-acoustic transducing means to a selected instrument.

2. A system as set forth in claim 1, and further including a teacher's musical instrument having means for selectively producing electric oscillations corresponding to the audio tones of that instrument, and means connecting said teacher's instrument to said monitor, said monitor switching means selectively connecting said teacher's instrument to one of said electro-acoustic transducing means.

3. A system as set forth in claim 1, and further including a microphone, and means including switch means interconnecting said microphone and said monitor and operable to cause sounds picked up by said microphone to override other sounds emanating from a selected electro-acoustic transducing means.

4. A system as set forth in claim 1, and further including means for connecting at least one additional source of electric signals corresponding to audio tones to said monitor, said connecting means being connected to said switch means for selective audio translation thereof from one of said electro-acoustic transducing means.

5. A system as set forth in claim 1 wherein each of said first and second separable connectors includes a pair of additional terminals, means connecting electric power to at least one of said pair of terminals, and means connecting all of said pairs of terminals to the respective means for selectively producing electric oscillations.

6. An electronic communications system for the teaching of the playing of a musical instrument comprising a plurality of keyboard musical instruments each having a case, means in said case for selectively producing electric oscillations corresponding to the audio tones of that instrument, a plurality of keys in a keyboard for selectively controlling the production of such oscillations, electroacoustic transducing means at each instrument for audibly reproducing said oscillations, a plurality of first separable connectors each mounted on one of said cases adjacent one end thereof and having a plurality of externally accessible terminals at least equal in number to said plurality of musical instruments and positioned in predetermined pattern, means internally of each case connecting the oscillation producing means of that instrument to one of said terminals, the oscillation producing means of each instrument being connected to a terminal of different position in said pattern, a plurality of second separable connectors each carried by one of said cases adjacent the other end thereof and also having a plurality of externally accessible terminals at least equal in number to said plurality of instruments and positioned in a predetermined pattern, a cable in each case having a plurality of conductors therein respectively interconnecting each terminal of the first connector of that case to a corresponding terminal of the second connector of that case, a plurality of jumper cables having separable connectors respectively complementary to a first separable connecter and a second separable connector and readily connected thereto and disconnected therefrom for electrically interconnecting said instruments externally, a monitor, electro-acoustic transducing means connected to said monitor, a cable connected to said monitor and having a complementary connector connected to one of said separable connectors of a first of said musical instruments, said cable having a number of terminals and conductors at least equal to those of said one separable connector and respectively connecting said terminals to said monitor, and switch means in said monitor for selectively connecting said monitor, said monitor electro-acoustic transducing means, and said electric oscillation producing means.

7. A system as set forth in claim 6 wherein each of said first and second separable connectors has a pair of additional terminals, means connecting a source of electric power to at least one of said additional pair of terminals, said oscillation producing means requiring electric power and having a separable power connector accessible externally of the case in which said oscillation producing means is mounted, and an externally accessible power cable running from said pair of additional terminals of each case to the power terminals and readily removed therefrom for attachment of a separate power cord to said power terminals for individual operation of an instrument.

8. A system as set forth in claim 6 wherein the electro-acoustic transducing means of each instrument comprises a loudspeaker and headphones, first switch means at each instrument for connecting the electric oscillation producing means thereof selectively to the loudspeaker or to the headphones, second switch means at each instrument for connecting said electric oscillation producing means direct to the headphones at that instrument or through said monitor to said headphones at said instrument, in the latter case all instruments connected to said monitor thereby being connected to the headphones at said instrument.

References Cited

UNITED STATES PATENTS

| | | |
|---|---|---|
| 1,750,988 | 3/1930 | Bostelmann. |
| 3,270,438 | 9/1966 | Ephraim _____ 35—5 |
| 3,377,716 | 4/1968 | Schmoyer _____ 35—6 |

EUGENE R. CAPOZIO, Primary Examiner

WALTER W. NIELSEN, Assistant Examiner

U.S. Cl. X.R.

84—478

UNITED STATES PATENT OFFICE
CERTIFICATE OF CORRECTION

Patent No. 3,475,833                        November 4, 1969

Clifford W. Andersen

It is certified that error appears in the above identified patent and that said Letters Patent are hereby corrected as shown below:

Column 7, line 42, "electric" should read -- electronic - line 67, after "instru-" insert -- ments, a monitor, a cable connected to said monitor and --; line 64, "respecively" should read -- respectively --.

Signed and sealed this 15th day of September 1970.

(SEAL)
Attest:

Edward M. Fletcher, Jr.                        WILLIAM E. SCHUYLER, JR.
Attesting Officer                                  Commissioner of Patents